United States Patent [19]

Inouye et al.

[11] Patent Number: 5,112,682

[45] Date of Patent: May 12, 1992

[54] PRIMER FOR IMPROVING ADHESION TO PLASTICS

[75] Inventors: Yoshio Inouye, Annaka; Takeo Inoue, Yokohama; Toshihide Shimizu, Kamisu; Ichiro Kaneko, Hazaki, all of Japan

[73] Assignee: Shin-Etsu Chemical Co., Ltd., Tokyo, Japan

[21] Appl. No.: 307,637

[22] Filed: Feb. 8, 1989

[30] Foreign Application Priority Data

Feb. 9, 1988 [JP] Japan .................................. 63-29798

[51] Int. Cl.$^5$ ................................................ C09J 5/02
[52] U.S. Cl. ...................................... 428/353; 428/354; 428/412; 428/421; 428/448; 428/451; 428/475.5; 428/480; 428/523; 106/287.14
[58] Field of Search ............... 106/490, 491, 496, 495, 106/287.14; 524/190; 428/523, 353, 354, 412, 421, 448, 451, 475.5, 480; 427/207.1

[56] References Cited

U.S. PATENT DOCUMENTS

| | | | |
|---|---|---|---|
| 3,003,892 | 10/1961 | Shannon | 524/190 X |
| 3,290,165 | 12/1966 | Iannicelli | 106/490 X |
| 3,509,125 | 4/1970 | Ronco et al. | 106/396 X |
| 3,609,134 | 9/1971 | Mory | 106/496 X |
| 3,817,769 | 6/1974 | Fisher | 106/287.14 |
| 3,975,554 | 8/1976 | Kummins et al. | 524/317 X |
| 4,107,133 | 8/1975 | Sawai et al. | 524/190 X |
| 4,160,642 | 7/1979 | Desiderio | 524/190 X |
| 4,233,206 | 11/1980 | Katsura et al. | 524/190 X |
| 4,395,301 | 7/1983 | Bauer et al. | 106/287.21 X |
| 4,571,369 | 2/1986 | Yamashita | 106/496 X |
| 4,654,262 | 3/1987 | Alonso et al. | 428/353 X |
| 4,681,632 | 7/1987 | Bes et al. | 106/491 |
| 4,698,386 | 10/1987 | Fujimoto | 524/190 X |

FOREIGN PATENT DOCUMENTS

| | | | |
|---|---|---|---|
| 42-8472 | 4/1967 | Japan | 524/190 |
| 43-12960 | 5/1968 | Japan | 524/190 |
| 54-21779 | 8/1979 | Japan | 524/190 |
| 62-55950 | 3/1987 | Japan | 524/190 |
| 62-169846 | 7/1987 | Japan | 524/190 |
| 439506 | 8/1974 | U.S.S.R. | 106/490 |

*Primary Examiner*—Mary C. Lee
*Assistant Examiner*—Fiona T. Powers
*Attorney, Agent, or Firm*—Oblon, Spivak, McClelland, Maier & Neustadt

[57] ABSTRACT

A primer comprising at least one selected from the group consisting of dyes and pigments, and, optionally, at least one selected from the group consisting of an organosilicon compound represented by Formula (I):

$$R^3-\underset{\underset{(OR^2)_{3-n}}{|}}{Si}-(R^1)_n \qquad (I)$$

wherein $R^1$ represents a monovalent hydrocarbon group; $R^2$ represents a substituted or unsubstituted monovalent hydrocarbon group; $R^3$ represents X— or X-$R^4$—, where X represents a monovalent hydrocarbon group containing an epoxy group, etc., and $R^4$ represents a saturated divalent hydrocarbon group; and n is an integer of 0 to 2, and a partial hydrolyzate thereof. This primer can import a good adhesion to so-called hardly adherable materials such as polyolefin plastics.

10 Claims, 1 Drawing Sheet

PRIMER FOR IMPROVING ADHESION TO PLASTICS

BACKGROUND OF THE INVENTION

1. Field of the Invention

This invention relates to a primer, and more particularly a primer capable of imparting a good adhesion even to hardly adherable materials such as olefin plastics.

2. Description of the Prior Art

In general, polyolefin plastics such as polyethylene and polypropylene are materials to which adhesives can adhere with difficulty, and hence they are subjected to a surface modification treatment to improve adhesion, after which the adhesives are applied. Hitherto known methods for surface modification of, for example, polyethylene include chemical treatments using alkyl titanate, chromic acid, etc., and physical treatments in which the polyethylene is exposed to hot air, flame, ozone, ultraviolet light, corona discharge or the like, or applied with electron bonbardment.

The above treatments, however, require special chemicals or apparatus and thus have the disadvantages that their operation can not be made with simplicity. A simple method of enhancing the adhesion between materials includes a treatment with a primer, but no primer has been hitherto known which is effective for the polyolefin plastics.

SUMMARY OF THE INVENTION

Accordingly, an object of this invention is to provide a primer capable of imparting a good adhesion to the surfaces of hardly adherable materials such as polyolefin plastics, by merely coating it on the surfaces.

The present inventors found that the above object can be achieved by using a primer containing a dye or pigment.

Namely this invention provides a primer comprising at least one selected from the group consisting of dyes and pigments.

The primer of this invention may be merely coated on the surfaces of slightly adherent materials such as polyethylene and polypropylene, followed by drying, so that a good adhesion can be imparted to these plastics. With recent increase in demand for engineering plastics, this primer is also effective in simply carrying out forming or working by adhesion of these engineering plastics.

DETAILED DESCRIPTION OF THE PREFERRED EMBODIMENTS OF THE INVENTION

Figure 1:
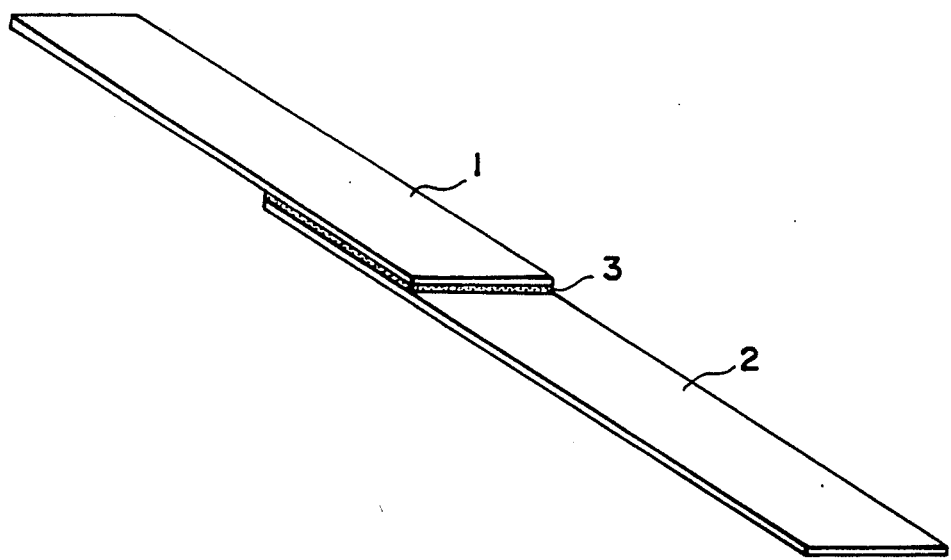
FIG. 1 illustrates a test specimen in the measurement of tensile shear strength and cohesive failure percentage in Examples and Comparative Examples.

The dye and pigment used in the primer of this invention may include, for example, azo dyes and pigments such as monoazo or polyazo dyes and pigments, metal complex azo dyes and pigments, stilbeneazo dyes, and thiazoleazo dyes; anthraquinone dyes and pigments such as anthraquinone derivatives, and anthrone derivatives; indigoid dyes and pigments such as indigo derivatives, and thioindigo derivatives; phthalocyanine dyes and pigments; carbonium dyes and pigments such as diphenylmethane dyes, triphenylmethane dyes and pigments, xanthene dyes, and acrydine dyes; quinoneimine dyes such as azine dyes, oxazine dyes, and thiazine dyes; methine dyes such as polymethine or cyanine dyes; quinoline dyes; nitro dyes; benzoquinone or naphthoquinone dyes; naphthalimide dyes and pigments; perinone dyes; sulfide dyes; fluorescent dyes; azoic dyes; and reactive dyes. These can be used alone or in combination of two or more kinds. Of the dyes and pigments exemplified above, preferred are monoazo dyes, polyazo dyes, anthrone derivative anthraquinone dyes and pigments, acrydine dyes, azine dyes, oxazine dyes, thiazine dyes, fluorescent dyes, and azoic dyes, and particularly preferred are azine dyes.

More specific examples of these dyes and pigments are as follows:

1) The azo dyes and pigments include the following:

The monoazo or polyazo dyes include, for example, Basic Yellow 32, 34 and 36; Basic Orange 2, 32, 33 and 34; Basic Red 17, 18, 22, 23, 24, 32, 34, 38, 39 and 40; Basic Violet 26 and 28; Basic Blue 58, 59, 64, 65, 66, 67 and 68; Basic Brown 1, 4, 11 and 12; Basic Black 8; Azoic Diazo Component 4, 21, 27 and 38; Disperse Yellow 3, 4, 5, 7, 8, 23, 50, 60, 64, 66, 71, 72, 76, 78 and 79; Disperse Orange 1, 3, 5, 13, 20, 21, 30, 32, 41, 43, 45, 46, 49, 50 and 51; Disperse Red 1, 5, 7, 12, 13, 17, 43, 52, 54, 56, 58, 60, 72, 73, 74, 75, 76, 80, 82, 84, 88, 90, 97, 99, 101, 103, 113, 117, 122, 125, 126, 128 and 129; Disperse Violet 10, 24, 33, 38, 41, 43 and 96; Disperse Blue 85, 92, 94 and 106; Disperse Brown 3 and 5; Disperse Black 1, 2, 10, 26, 27, 28, 29, 30 and 31; Solvent Yellow 2, 6, 14, 15, 16, 19, 21 and 56; Solvent Orange 1, 2, 5, 6, 14 and 45; Solvent Red 1, 3, 23, 24, 25, 27 and 30; Solvent Brown 3, 5 and 20; Solvent Black 3; Pigment Yellow 1, 2, 3, 4, 5, 6, 7, 10, 11, 12, 13, 14, 15, 16, 17, 23, 65, 73 and 83; Pigment Orange 1, 2, 5, 13, 14, 15, 16, 17, 24 and 31; Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 112, 114 and 163; Pigment Blue 25; Pigment Green 10; Pigment Brown 1 and 2; Pigment Black 1; Direct Yellow 1, 8, 11, 12, 24, 26, 27, 28, 33, 44, 50, 58, 85, 86, 87, 88, 89, 98, 100 and 110; Direct Orange 1, 6, 8, 10, 26, 29, 39, 41, 49, 51, 57, 102 and 107; Direct Red 1, 2, 4, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230 and 231; Direct Violet 1, 7, 9, 12, 22, 35, 51, 63, 90, 94 and 98; Direct Blue 1, 2, 6, 8, 15, 22, 25, 71, 76, 77, 78, 80, 120, 123, 158, 160, 163, 165, 168, 192, 193, 194, 195, 196, 203, 207, 225, 236, 237, 246, 248 and 249; Direct Green 1, 6, 8, 28, 30, 31, 33, 37, 59, 63, 64 and 74; Direct Brown 1A, 2, 6, 25, 27, 44, 58, 59, 101, 106, 173, 194, 195, 209, 210 and 211; Direct Black 17, 19, 22, 32, 38, 51, 56, 71, 74, 75, 77, 94, 105, 106, 107, 108, 112, 113, 117, 188, 132, 133 and 146; Acid Yellow 11, 17, 19, 23, 25, 29, 36, 38, 40, 42, 44, 49, 61, 70, 72, 75, 76, 78, 79, 110, 127, 131, 135, 141, 142, 164 and 165; Acid Orange 1, 7, 8, 10, 19, 20, 24, 28, 33, 41, 43, 45, 51, 56, 63, 64, 65, 67 and 95; Acid Red 1, 6, 8, 9, 13, 14, 18, 26, 27, 32, 35, 37, 42, 57, 75, 77, 85, 88, 89, 97, 106, 111, 114, 115, 117, 118, 119, 129, 130, 131, 133, 134, 138, 143, 145, 154, 155, 158, 168, 249, 252, 254, 257, 262, 265, 266, 274, 276, 282, 283 and 303; Acid Red Violet 7, 11, 97 and 106; Acid Blue 29, 60, 92, 113, 117 and 120; Acid Green 19, 20 and 48; Acid Brown 2, 4, 13, 14, 20, 53, 92, 100, 101, 236, 247, 266, 268, 276, 277, 282, 289, 301 and 302; Acid Black 1, 7, 24, 26, 29, 31, 44, 76, 77, 94, 109 and 110; Mordant Yellow 1, 3, 5, 23, 26, 30, 38 and 59; Mordant Orange 1, 4, 5, 6, 8, 29 and 37; Mordant Red 7, 9, 17, 19, 21, 26, 30, 63 and 89; Mordant Violet 5 and 44; Mordant Blue 7, 13, 44, 75 and 76; Mordant Green 11, 15, 17, and 47; Mordant Brown 1, 14, 15, 19, 21, 33, 38, 40, 52 and 87; Mordant Black 1, 3, 7, 9, 11, 17, 26, 32, 38, 43, 44, 51, 54, 65, 75, 77, 84, 85, 86 and 87; Food Yellow 3 and 4; and Food Red 7 and 9;

the metal complex azo dyes include, for example, Solvent Yellow 61 and 80; Solvent Orange 37, 40 and 44; Solvent Red 8, 21, 83, 84, 100, 109 and 121; Solvent Brown 37; Solvent Black 23; Acid Black 51, 52, 58, 60, 62, 63, 64, 67, 72, 107, 108, 112, 115, 118, 119, 121, 122, 123, 131, 132, 139, 140, 155, 156, 157, 158, 159 and 191; Acid Yellow 59, 98, 99, 111, 112, 114, 116, 118, 119, 128, 161, 162 and 163; Acid Orange 74, 80, 82, 85, 86, 87, 88, 122, 123 and 124; Acid Red 180, 183, 184, 186, 194, 198, 199, 209, 211, 215, 216, 217, 219, 256, 317, 318, 320, 321 and 322; Acid Violet 75 and 78; Acid Blue 151, 154, 158, 161, 166, 167, 168, 170, 171, 175, 184, 187, 192, 199, 229, 234 and 236; Acid Green 7, 12, 35, 43, 56, 57, 60, 61, 65, 73, 75, 76, 78 and 79; Acid Brown 19, 28, 30, 31, 39, 44, 45, 46, 48, 224, 225, 226, 231, 256, 257, 294, 295, 296, 297, 299 and 300; Direct Yellow 39; Direct Violet 47 and 48; Direct Blue 90, 98, 200, 201, 202 and 226; and Direct Brown 95, 100, 112 and 170;

the stilbeneazo dyes include, for example, Direct Black 62; and the thiazoleazo dyes include, for example, Direct Red 9 and 11.

2) The anthraquinone dyes and pigments include the following:

The anthraquinone derivatives include, for example, Basic Violet 25; Basic Blue 21, 22, 44, 45, 47, 54 and 60; Azoic Diazo Component 36, Vat Yellow 2, 3, 10, 20, 22 and 33; Vat Orange 13 and 15; Vat Red 10, 13, 16, 31, 35, and 52; Vat Violet 13 and 21; Vat Blue 4, 6, 8, 12, 14, 64, 67 and 72; Vat Green 8, 13, 43, 44 and 45; Vat Brown 1, 3, 22, 25, 39, 41, 44, 46, 57, 68, 72 and 73; Vat Black 8, 14, 20, 25, 27, 36, 56, 59 and 60; Disperse Orange 11; Disperse Red 4, 9, 11, 15, 53, 55, 65, 91, 92, 100, 104, 116 and 127; Disperse Violet 1, 4, 8, 23, 26, 28, 30 and 37; Disperse Blue 1, 3, 5, 6, 7, 20, 26, 27, 54, 55, 56, 60, 61, 62, 64, 72, 73, 75, 79, 81, 87, 90, 91, 97, 98, 99, 103, 104 and 105; Disperse Yellow 51; Solvent Violet 13 and 14; Solvent Blue 11, 12, 35 and 36; Solvent Green 3; Pigment Red 83 and 89; Pigment Blue 22; Acid Violet 31, 34, 35, 41, 43, 47, 48, 51, 54, 66 and 68; Acid Blue 23, 25, 27, 40, 41, 43, 45, 54, 62, 72, 78, 80, 82, 112, 126, 127, 129, 130, 131, 138, 140, 142, 143, 182, 183, 203, 204 and 205; Acid Green 25, 27, 28, 36, 40, 41 and 44; Acid Brown 27; Acid Black 48 and 50; Mordant Red 3 and 11; Mordant Blue 8 and 48; Mordant Black 13; and Pigment Violet 5; and the anthrone derivatives include, for example, Vat Yellow 1 and 4; Vat Orange 1, 2, 3, 4 and 9; Vat Violet 1, 9 and 10; Vat Blue 18, 19 and 20; Vat Green 1, 2, 3 and 9; Vat Black 9, 13, 29 and 57; Vat Red 13; and Acid Red 80, 82 and 83.

3) The indigoid dyes and pigments include the following:

The indigoid derivatives include, for example, Vat Blue 1, 3, 5, 35 and 41; Reduced Vat Blue 1; Pigment Violet 19 and 122; Acid Blue 74 and 102; Solubilized Vat Blue 5 and 41; Solubilized Vat Black 1; and Food Blue 1; and the thioindigo derivatives include, for example, Vat Orange 5; Vat Red 1, 2 and 61; Vat Violet 2 and 3; Pigment Ret 87 and 88; and Vat Brown 3.

4) The phthalocyanine dyes and pigments include, for example, Solvent Blue 55; Pigment Blue 15, 16 and 17; Pigment Green 36, 37 and 38; Direct Blue 86, and 199; and Mordant Blue 58.

5) The carbonium dyes and pigments include the following:

the diphenylmethane dyes include, for example, Basic Yellow 2;

the triphenylmethane dyes include, for example, Basic Red 9; Basic Violet 1, 3 and 14; Basic Blue 1, 5, 7, 19, 26, 28, 29, 40 and 41; Basic Green 1 and 4; Solvent Violet 8; Solvent Blue 2 and 73; Pigment Violet 3; Pigment Blue 1, 2 and 3; Pigment Green 1, 2 and 7; Direct Blue 41; Acid Violet 15 and 49; Acid Blue 1, 7, 9, 15, 22, 83, 90, 93, 100, 103 and 104; Acid Green 3, 9 and 16; Mordant Violet 1; Mordant Blue 1, 29 and 47; Food Violet 2; Food Blue 2; and Food Green 2;

the xanthene dyes include, for example, Basic Red 1; Solvent Red 49; Pigment Red 81 and 90; Pigment Violet 1, 2 and 23; Acid Red 51, 52, 87, 92 and 94; Mordant Red 15 and 27; and Food Red 14; and the acrydine dyes include, for example, Basic Orange 14 and 15.

6) The quinoneimine dyes include the following:

The azine dyes include, for example, Basic Red 2; Basic Black 2; Solvent Black 5 and 7; Acid Blue 59; and Acid Black 2;

the oxazine dyes include, for example, Basic Blue 3; Direct Blue 106 and 108; and the thiazine dyes include, for example, Basic Yellow 1; and Basic Blue 9, 24 and 25.

7) The methine dyes include the following:

The polymethine (or cyanine) dyes include, for example, Basic Yellow 11, 13, 14, 19, 21, 25, 28, 33 and 35; Basic Orange 21 and 22; Basic Red 12, 13, 14, 15, 27, 29, 35, 36 and 37; and Basic Violet 7, 15, 21 and 27.

8) The quinoline dyes include, for example, Basic Green 6; Disperse yellow 54 and 56; Solvent yellow 33; and Acid yellow 3.

9) The nitro dyes include, for example, Disperse yellow 1, 33, 39, 42, 49 and 54; and Acid Yellow 1.

10) The benzoquinone or naphthoquinone dyes include, for example, Disperse Blue 58 and 108; and Acid Brown 103, 104, 106, 160, 160, 165 and 188.

11) The naphthalimide dyes and pigments include, for example, Pigment Red 123; Vat Violet 23 and 29; and Acid Yellow 7.

12) The perinone dyes include, for example, Vat Orange 7 and 15.

13) The sulfide dyes include, for example, Solubilized Sulfur yellow 2; Sulfur yellow 4; Sulfur Orange 3; Sulfur Red 2, 3, 5 and 7; Solubilized Sulfur Blue 15; Sulfur Blue 2, 3, 4, 6, 7, 9 and 13; Sulfur Green 2, 3, 6, 14 and 27; Solubilized Sulfur Brown 1 and 51; Sulfur Brown 7, 12, 15 and 31; Sulfur Black 1, 2, 5, 6, 10, 11 and 15; Vat Yellow 35, 42 and 43; and Vat Blue 43 and 56.

14) The fluorescent dyes include, for example, Fluorescent Brightening Agent 14, 22, 24, 30, 32, 37, 45, 52, 54, 55, 56, 84, 85, 86, 87, 90, 91, 104, 112, 121, 134, 135, 153, 162, 163, 164, 166, 167, 168, 169, 170, 171, 172, 173, 174, 175, 176 and 177.

15) The azoic dyes include, for example, Azoic Diazo Component 17, 20, 22, 24, 26, 31, 35, 41, 47, 48, 109 and 121; Azoic Coupling Component 2, 3, 4, 5, 7, 8, 10, 11, 12, 14, 15, 16, 17, 18, 19, 20, 23, 26, 28, 29, 35, 36, 37, 41 and 108; Azoic Brown 2, 7, 11 and 15; Azoic Black 1 and 5; Azoic yellow 1 and 2; Azoic Orange 2, 3 and 7;

Azoic Red 1, 2, 6, 9, 16 and 24; Azoic Violet 1, 2, 6, 7, 9 and 10; and Azoic Green 1.

16) The reactive dyes include, for example, Reactive Yellow 1, 2, 3, 4, 6, 7, 11, 12, 13, 14, 15, 16, 17, 18, 22, 23, 24, 25, 26, 27, 37 and 42; Reactive Orange 1, 2, 4, 5, 7, 13, 14, 15, 16, 18, 20, 23 and 24; Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63 and 64; Reactive Violet 1, 2, 4, 5, 8, 9 and 10; Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44 and 46; Reactive Green 5, 6, 7 and 8; Reactive Brown 1, 2, 5, 7, 8, 9, 10, 11, 14 and 16; Reactive Black 1, 3, 4, 5, 6, 8, 9, 10, 12, 13, 14 and 18.

In a preferred embodiment of this invention, the primer may further contains not more than 50 parts by weight of at least one selected from an organosilicon compound represented by Formula (I):

wherein $R^1$ represents a monovalent hydrocarbon group; $R^2$ represents a substituted or unsubstituted monovalent hydrocarbon group; $R^3$ represents X— or X—$R^4$—, where X represents a monovalent hydrocarbon group containing an epoxy group, a substituted or unsubstituted amino group, an alkenyl group, an acryloyloxy group, a methacryloyloxy group, a mercapto group or a halogen atom, and $R^4$ represents a saturated divalent hydrocarbon group; and n is an integer of 0 to 2, and a partial hydrolyzate thereof, based on 100 parts by weight of at least one of said dyes and pigments. The primer according to this embodiment can achieve a stronger adhesion.

$R^1$ in the above Formula (I) represents a monovalent hydrocarbon group, which may include, for example, an alkyl group such as a methyl group, an ethyl group or a propyl group, and an aryl group such as a phenyl group or a tolyl group, and preferably a methyl group and an ethyl group.

$R^2$ represents a substituted or unsubstituted monovalent hydrocarbon group, which may include, for example, an alkyl group such as a methyl group, an ethyl group or a propyl group, an alkoxyalkyl group such as a methoxyethyl group, and preferably a methyl group and an ethyl group.

$R^3$ represents X— or X—$R^4$—, where X represents a monovalent hydrocarbon group containing an epoxy group, a substituted or unsubstituted amino group, an alkenyl group, an acryloyloxy group, a methacryloyloxy group, a mercapto group or a halogen atom, and $R^4$ represents a saturated divalent hydrocarbon group. The above monovalent hydrocarbon group containing an epoxy group may include, for example, a glycidoxy group and a 3,4-epoxycyclohexyl group. The substituted or unsubstituted amino group may include, for example, $H_2N—$, $H_2NC_2H_4NH—$, $H_2NC_6H_{12}NH—$, $CH_2=CH—C_6H_4—CH_2NH—$, $C_6H_5NH—$ and $H_2NC_2H_4NHC_2H_4NH—$, and preferably $H_2N—$, $H_2NC_2H_4NH—$ and $C_6H_5NH—$. The alkenyl group may include, for example, a vinyl group and an allyl group. The halogen atom may include, for example, chlorine, bromine and iodine, and preferably chlorine. Particularly preferred as $R^3$ are a vinyl group, a glycidoxy group, a 3,4-epoxycyclohexylmethyl group, an amino group, a (betaaminoethyl)amino group, a phenylamino group, an acryloyloxy group, a methacryloyloxy group, a mercapto group and a chlorine atom.

$R^4$ represents a saturated divalent hydrocarbon group, which may include, for example, an alkylene group such as a methylene group, an ethylene group, a trimethylene group, a tetramethylene group or a pentamethylene group, and preferably a methylene group or a trimethylene group.

Examples of the organosilicon compound represented by Formula (I) include the compounds of the following formula:

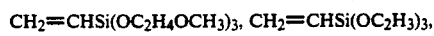

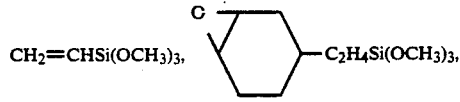

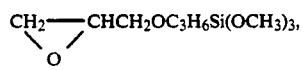

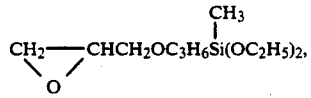

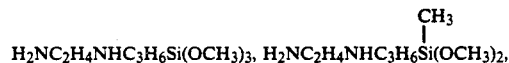

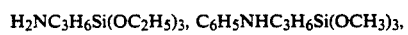

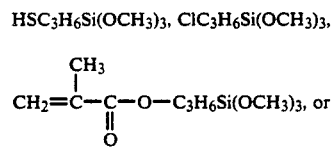

The organosilicon compound represented by the above Formula (I) can be used alone or in combination of two or more kinds.

The primer of this invention is usually formed by dissolving or dispersing the above dye or pigment, optionally together with the organosilicon compound represented by Formula (I), in a solvent. The dye or pigment and organosilicon compound represented by Formula (I) may preferably be in a concentration of from 0.01 to 5% by weight, and particularly preferably from 0.1 to 3% by weight, in total.

Also, the organosilicon compound represented by Formula (I) may be used in the proportion, based on 100 parts by weight of the dye or pigment, of not more than 50 parts by weight, preferably from 0.01 to 20 parts by weight, and particularly preferably from 0.1 to 10 parts by weight.

In the primer of this invention, the solvent that can be used for dissolving or dispersing the above components includes, for example, aromatic hydrocarbons such as benzene, toluene, and xylene;

halogenated hydrocarbons such as trichloroethylene, perchloroethylene, chloroform, carbon tetrachloride, ethylene trichloride, benzene monobromide, benzene monochloride, and benzene dichloride;

alcohols such as amyl alcohol, ethyl alcohol, isopropyl alcohol, 2-ethylbutyl alcohol, 2-ethylhexyl alcohol, cyclohexanol, methyl alcohol, methyl amyl alcohol, benzyl alcohol, and butyl alcohol;

ketones such as acetone, acetonylacetone, diisobutyl ketone, diethyl ketone, dipropyl ketone, methyl amyl ketone, methyl butyl ketone, methyl cyclohexanone, methyl dipropyl ketone, methyl ethyl ketone, methyl n-hexyl ketone, methyl isobutyl ketone, methyl propyl ketone, and mesityl oxide;

esters such as acetates, butyrates, propionates, and formates;

alcohol esters such as butyl lactate, isopropyl lactate, ethyl lactate, ethyl oxypropionate, and diethyl maleate;

ketone esters such as ethyl acetoacetate, and ethyl pyruvate;

ethers such as isopropyl ether, ethyl ether, diethyl carbitol, diethyl cellosolve, and butyl ether;

ketone alcohols such as acetonyl methanol, diacetone alcohol, dihydroxyacetone, and pyruvinalcohol;

ether alcohols such as isopropyl cellosolve, carbitol, glycidol, cellosolve, glycol ether, benzyl cellosolve, butyl carbitol, butyl cellosolve, methyl carbitol, methyl cellosolve, and triethylene glycol monoethyl ether;

ketone ethers such as acetal ethyl ether, acetonyl methanol ethyl ether, and methyl ethoxyethyl ether; and ester ethers such as butyl carbitol acetate, butyl cellosolve acetate, carbitol acetate, cellosolve acetate, 3-methoxybutyl acetate, methyl carbitol acetate, and methyl cellosolve acetate. These solvents can be used either alone or in combination of two or more kinds.

There are no particular limitations on the manner by which the dye or pigment and, optionally organosilicon compound are dissolved or dispersed in the solvent, and, for example, these components may be added in the solvent and dissolved or dispersed with stirring, and optionally with heating.

The primer of this invention thus obtained is coated on the surface of a substrate to which adhesion is to be imparted, followed by drying, so that an adhesion can be imparted to the surface. There are no particular limitations on the manner of coating the primer on the surface, and it may be coated by any methods commonly employed in the coating of primers, as exemplified by dipping, spraying, brushing and spraying.

The primer of this invention, having been coated on the substrate surface, may be usually dried at room temperature to 150° C.

The primer of this invention, when coated on the surfaces of various materials, can impart adhesion on the surfaces. In particular, it is effective in instances in which so-called hardly adherable plastics such as polyethylene, polypropylene, Teflon, polyphenylene sulfide, polyethylene terephthalate, modified polyphenylene ether, polybutylene terephthalate, polyacetal, polycarbonate and nylon are adhered to the like materials or other materials with use of a silicone adhesive, polyurethane adhesive, polysulfide adhesive, modified silicone adhesive or epoxy adhesive, or in instances in which a silicone sealant, coating medium, potting medium or the like is adhered to the surfaces of the above slightly adherent materials. Among these, it is particularly effective when the silicone adhesive, sealant, coating medium or potting medium is used.

The above silicone adhesive, sealant, coating medium or potting medium may include, for example, room temperature curing silicones and heat curling silicones. They are exemplified by KE45, Sealant 72, Sealant 90, Sealant 70, Sealant 80, KE3497 and KE3498, which are commercially available products of Shin-Etsu Chemical Co., Ltd.

The primer of this invention is also effective for adhesion of plastics other than the above hardly adherable materials, or adhesion of metals and glass.

EXAMPLES

This invention will be described below in greater detail by way of giving Examples.

EXAMPLES 1 TO 14

In the manner as shown in the following Table 1, a dye or pigment was dissolved in a solvent to prepare primers of corresponding Examples.

In each Example, two sheets of polyethylene plates 100 mm long, 25 mm wide and 2 mm thick and two sheets of polypropylene plates with the same dimensions were provided, and the primer obtained in the above was coated on the surfaces of these plates, followed by drying under conditions shown in Table 1.

TABLE 1

| Example | Dye or pigment | Concentration (wt. %) | Solvent | Drying |
| --- | --- | --- | --- | --- |
| 1 | Solvent Black 5 | 0.1 | Methanol | Room temp., 30 min |
| 2 | Solvent Black 7 | 0.03 | Methyl ethyl ketone | 60° C., 30 min |
| 3 | Basic Blue 3 | 0.2 | Methanol | Room temp., 30 min |
| 4 | Basic Yellow 1 | 0.2 | " | Room temp., 30 min |
| 5 | Basic Blue 9 | 0.2 | " | Room temp., 30 min |
| 6 | Solvent Orange 1 | 0.5 | Toluene | 60° C., 30 min |
| 7 | Solvent Orange 6 | 0.1 | Ethyl acetate | Room Temp., 30 min |
| 8 | Mordant Red 9 | 0.1 | Acetone | Room temp., 30 min |
| 9 | Azoic Coupling Component 4 | 0.1 | Xylene | 60° C., 30 min |
| 10 | Violet Orange 1 | 0.1 | Xylene | 60° C., 30 min |
| 11 | Disperse Yellow 3 | 0.1 | Acetone | Room temp., 30 min |
| 12 | Fluorescent Brightening | 1.0 | Ethanol | Room temp., |

TABLE 1-continued

| Example | Dye or pigment | Concentration (wt. %) | Solvent | Drying |
|---|---|---|---|---|
| 13 | Solvent Black 7 | 0.1 | Methylene chloride | 30 min Room temp., 30 min |
| 14 | Acid Black 1 + Basic Orange 14 | 0.5 | Water (1:1 in weight ratio) | 90° C., 30 min |

Next, to describe the case when the polyethylene plates are used, the surfaces of a pair of polyethylene plates 1 and 2 on which the primer has been coated were adhered to each other as shown in FIG. 1, over a length of 1 cm (adhesive area: 2.5 cm²; thickness of adhesive layer: 2 mm) with use of an adhesive 3 (KE45 or Sealant 72, products of Shin-Etsu Chemical Co., Ltd.), which were left for 7 days in an atmosphere of 20° C. and 55% RH to cure the adhesive. On specimens prepared in this way, their tensile shear strength and cohesive failure percentage after cure of the adhesive were measured according to the following methods.

Tensile Shear Strength

Measured at a pulling rate of 50 mm/min with use of a strograph (manufactured by Toyo Seiki).

Cohesive Failure Percentage

Calculated from the following formula on the basis of a state of the destruction of the specimens on which the tensile shear strength has been tested:

$$\frac{\text{Cohesive failure area}}{\text{Cohesive failure area} + \text{Interface peel area}} \times 100$$

where Cohesive failure area + Interface peel area = 2.5 cm².

The tensile shear strength and cohesive failure percentage were also measured on the specimens prepared in the same manner as the above using a pair of polypropylene plates on which the primer has been coated.

Results obtained are shown in Table 2.

TABLE 2

| | Adhesive: Sealant 72 | | | | Adhesive: KE45 | | | |
|---|---|---|---|---|---|---|---|---|
| | Adherend material: | | | | | | | |
| | Polyethylene | | Polypropylene | | Polyethylene | | Polypropylene | |
| Example: | TS* | CF** | TS | CF | TS | CF | TS | CF |
| 1 | 6.6 | 80 | 8.3 | 100 | 2.0 | 0 | 1.5 | 0 |
| 2 | 7.6 | 100 | 5.4 | 70 | 3.1 | 0 | 3.6 | 0 |
| 3 | 6.0 | 70 | 5.2 | 70 | 1.5 | 0 | 1.3 | 0 |
| 4 | 4.5 | 50 | 5.0 | 50 | 1.0 | 0 | 1.4 | 0 |
| 5 | 5.5 | 60 | 6.0 | 65 | 2.0 | 0 | 2.3 | 0 |
| 6 | 8.0 | 100 | 7.5 | 90 | 2.5 | 0 | 2.8 | 0 |
| 7 | 6.5 | 80 | 7.0 | 80 | 1.8 | 0 | 2.2 | 0 |
| 8 | 5.8 | 70 | 6.0 | 75 | 2.0 | 0 | 2.1 | 0 |
| 9 | 7.3 | 70 | 6.8 | 60 | 1.0 | 0 | 1.2 | 0 |
| 10 | 5.0 | 40 | 4.4 | 35 | 1.0 | 0 | 1.1 | 0 |
| 11 | 6.5 | 60 | 7.0 | 65 | 2.0 | 0 | 2.3 | 0 |
| 12 | 5.0 | 50 | 5.4 | 55 | 2.2 | 0 | 2.5 | 0 |
| 13 | 8.0 | 100 | 8.5 | 100 | 3.5 | 0 | 3.8 | 0 |
| 14 | 7.0 | 60 | 6.4 | 50 | 1.5 | 0 | 2.1 | 0 |

Note:
*TS: Tensile shear strength (kg · f/cm²)
**CF: Cohesive failure percentage (%)

COMPARATIVE EXAMPLE 1

Respective pairs of polyethylene plates and polypropylene plates on which no primer has been coated were tried to be adhered in the same manner as Example 1, resulting, however, in no adhesion.

EXAMPLES 15 TO 21

COMPARATIVE EXAMPLES 2 AND 3

In the manner as shown in the following Table 3, a dye and a organic silicon compound were dissolved in solvents to prepare primers of corresponding Examples. Neither dye nor pigment was used in Comparative Examples 2 and 3.

TABLE 3

| | (wt. %) | | | | | | | | |
|---|---|---|---|---|---|---|---|---|---|
| | Example | | | | | | | Comparative Ex. | |
| | 15 | 16 | 17 | 18 | 19 | 20 | 21 | 2 | 3 |
| (A): | | | | | | | | | |
| Solvent Black 5 | 0.2 | | | | | | 0.3 | | |
| Solvent Black 7 | | 0.1 | | | 0.2 | 0.5 | | | |
| Basic Black 2 | | | 0.3 | | | | | | |
| Basic Red 2 | | | | 0.5 | | | | | |
| (B): | | | | | | | | | |
| $H_2NC_3H_6Si(OC_2H_5)_3$ | 1 | 0.5 | | 1 | | 1 | | 1 | 1 |
| $H_2NC_2H_4NHC_3H_6Si(OCH_3)_3$ | | 0.5 | 1 | | | | 1 | 1 | |
| $\begin{array}{c}\text{CH}_3\\|\\\text{CH}_2{=}\text{CCOOC}_3\text{H}_6\text{Si(OCH}_3)_3\end{array}$ | | | | | 1 | | | | 1 |
| $\underset{\diagdown O \diagup}{CH_2\text{------}CHCH_2OC_3H_6Si(OCH_3)_3}$ | | | 1 | | | 1 | | | 1 |
| $HSC_3H_6Si(OCH_3)_3$ | | | | | | | 1 | | |
| $CH_2{=}CHSi(OCH_3)_3$ | | | | | | | | 1 | |

TABLE 3-continued

| | (wt. %) | | | | | | | | |
|---|---|---|---|---|---|---|---|---|---|
| | Example | | | | | | | Comparative Ex. | |
| | 15 | 16 | 17 | 18 | 19 | 20 | 21 | 2 | 3 |
| (C): | | | | | | | | | |
| Ethanol | 98.8 | | | | 98.8 | | | | |
| Methanol | | 98.9 | 97.7 | 97.5 | | 97.5 | 97.7 | 98.0 | 97.0 |

In each Example and Comparative Example, the primer was coated by brushing on two sheets of polyethylene plates and two sheets of polypropylene plates like those used in Example 1, which were then dried at room temperature for 30 minutes, followed by adhering in the same manner as Example 1 to prepare specimens. On the resulting specimens, their tensile shear strength and cohesive failure percentage after cure of the adhesive were measured in the same manner as Example 1. Results obtained are shown in Table 4.

TABLE 4

| | Adhesive: | | | | | | | |
|---|---|---|---|---|---|---|---|---|
| | Sealant 72 | | | | KE45 | | | |
| | Adherend material: | | | | | | | |
| | Polyethylene | | Polypropylene | | Polyethylene | | Polypropylene | |
| | TS* | CF** | TS | CF | TS | CF | TS | CF |
| Example: | | | | | | | | |
| 15 | 8.0 | 100 | 8.2 | 100 | 7.5 | 90 | 8.0 | 95 |
| 16 | 8.5 | 100 | 8.5 | 100 | 7.0 | 80 | 7.5 | 90 |
| 17 | 8.0 | 90 | 8.2 | 100 | 6.5 | 60 | 6.0 | 60 |
| 18 | 7.5 | 90 | 8.5 | 95 | 7.0 | 80 | 7.5 | 85 |
| 19 | 9.0 | 100 | 9.1 | 100 | 8.0 | 85 | 8.0 | 85 |
| 20 | 8.5 | 100 | 9.0 | 100 | 7.5 | 80 | 7.8 | 80 |
| 21 | 9.0 | 100 | 9.0 | 100 | 8.0 | 85 | 8.0 | 85 |
| Comparative Example: | | | | | | | | |
| 2 | 0 | 0 | 0 | 0 | 0 | 0 | 0 | 0 |
| 3 | 0 | 0 | 0 | 0 | 0 | 0 | 0 | 0 |

Note:
*TS: Tensile shear strength (kg · f/cm$^2$)
**CF: Cohesive failure percentage (%)

What is claimed is:

1. In an assembly comprising a plastic article selected from the group consisting of polyethylene, polypropylene, polytetrafluorethylene, polyphenylene sulfide, polyethylene terephthalate, polyphenylene ethers, polybutylene terephthalate, polyacetal, polycarbonate and nylon articles, wherein an adhesive layer is deposited onto at least one surface of said article, the improvement comprising: a primer composition layer between said surface and said adhesive layer obtained by applying a solution or suspension of at least one azine dye selected from the group consisting of Basic Red 2, Solvent Black 5, Solvent Black 7, Acid Blue 59 and Acid Black 2; and at least one organosilicon compound represented by formula (I):

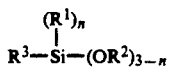

wherein $R^1$ represents a $C_1$-$C_7$ monovalent hydrocarbon group; $R^2$ represents a monovalent hydrocarbon group or a $C_1$-$C_3$ alkoxylalkyl group; $R^3$ represents X— or X—$R^4$—, where X represents a $C_1$-$C_6$ monovalent hydrocarbon group containing an epoxy group, a $C_1$-$C_6$ substituted or unsubstituted amino group, an alkenyl group, an acryloyloxy group, a methacryloyloxy group, a mercapto group or a halogen atom, and $R^4$ represents a $C_1$-$C_5$ saturated divalent hydrocarbon group; and n is an integer of 0 to 2.

2. The assembly according to claim 1, wherein $R^1$ represents a methyl group or an ethyl group, $R^2$ represents a methyl group or an ethyl group, $R^3$ represents a vinyl group, a glycidoxy group, a 3,4-epoxycylcohexylmethyl group, an amino group, a (beta-aminoethyl) amino group, a phenylamino group, an acryloyloxy group, a methacryloyloxy group, a mercapto group or a chlorine atom, and $R^4$ represents a methylene group or a trimethylene group.

3. The assembly according to claim 1, wherein said organosilicon compound represented by Formula (I) is a compound represented by the formula:

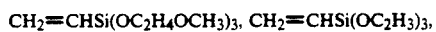

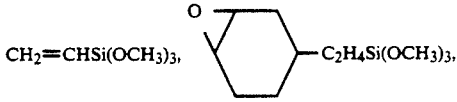

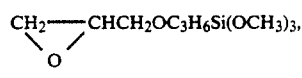

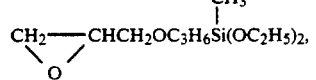

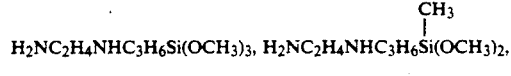

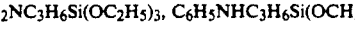

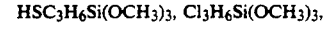

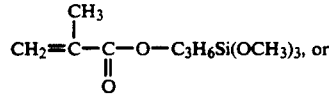

4. The assembly according of claim 1 wherein the organosilicon compound is contained in an amount of not more than 50 parts by weight based on 100 parts by weight of said azine dye.

5. The assembly according to claim 1, wherein said organosilicon compound is contained in an amount of from 0.01 to 20 parts by weight based on 100 parts by weight of said azine dye.

6. The assembly according to claim 5, wherein said organosilicon compound is contained in an amount of from 0.1 to 10 parts by weight based on 100 parts by weight of said azine dye.

7. The assembly according to claim 1, wherein said azine dye is dissolved in a solvent.

8. The assembly according to claim 7, wherein said azine dye is contained in a concentration of from 0.01 to 5% by weight.

9. The assembly according to claim 1, wherein the azine dye and said organosilicon compound are dissolved in a solvent.

10. The assembly according to claim 9, wherein said azine dye and said organosilicon compound are contained in a concentration of from 0.01 to 5% by weight in total.

* * * * *